US010014141B1

(12) United States Patent
Zheng et al.

(10) Patent No.: US 10,014,141 B1
(45) Date of Patent: Jul. 3, 2018

(54) NON-CONTACT SWITCH DEVICES FOR USE ON MATERIAL HANDLING EQUIPMENT

(71) Applicant: Big Lift, LLC, Lombard, IL (US)

(72) Inventors: Wang Zheng, Hangzhou (CN); Yang Yanfeng, Hangzhou (CN); Qi Xiaobin, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 0 days.

(21) Appl. No.: 15/393,428

(22) Filed: Dec. 29, 2016

(51) Int. Cl.
*B62B 3/06* (2006.01)
*H01H 36/00* (2006.01)
*H01H 36/02* (2006.01)

(52) U.S. Cl.
CPC .... *H01H 36/0013* (2013.01); *H01H 36/0046* (2013.01); *H01H 36/02* (2013.01); *H01H 2223/002* (2013.01)

(58) Field of Classification Search
CPC ..................................................... B62B 3/0612
USPC .................................................. 335/235, 151
See application file for complete search history.

(56) References Cited

U.S. PATENT DOCUMENTS

| 2,913,062 | A | * | 11/1959 | Ulinski | B62B 3/0612 |
| | | | | | 180/19.2 |
| 3,164,696 | A | * | 1/1965 | Pusch | H01H 36/008 |
| | | | | | 335/205 |
| 3,803,575 | A | * | 4/1974 | Gotanda | E05B 45/083 |
| | | | | | 200/61.64 |
| 5,541,562 | A | * | 7/1996 | Fletcher | H01H 36/0046 |
| | | | | | 335/205 |
| 6,249,224 | B1 | * | 6/2001 | Shoen | H01H 36/002 |
| | | | | | 200/61.93 |
| 6,359,538 | B1 | * | 3/2002 | Jolley | E05B 15/0205 |
| | | | | | 335/205 |
| 7,025,157 | B2 | * | 4/2006 | Lindsay | B62B 3/0612 |
| | | | | | 180/19.1 |
| 7,973,626 | B2 | * | 7/2011 | Gerner | F25D 29/005 |
| | | | | | 335/205 |
| 8,111,119 | B2 | * | 2/2012 | Gilmore | H01H 36/0006 |
| | | | | | 335/205 |
| 8,866,570 | B2 | * | 10/2014 | Gilmore | H01H 36/0006 |
| | | | | | 335/151 |
| 2003/0030522 | A1 | * | 2/2003 | Kasashima | H03K 17/97 |
| | | | | | 335/205 |
| 2005/0016779 | A1 | * | 1/2005 | Lindsay | B62B 3/0612 |
| | | | | | 180/19.3 |
| 2015/0336781 | A1 | * | 11/2015 | Neubauer | B66F 9/22 |
| | | | | | 254/2 R |

\* cited by examiner

*Primary Examiner* — Alexander Talpalatski
(74) *Attorney, Agent, or Firm* — Cook Alex Ltd.

(57) ABSTRACT

The disclosure provides a non-contact switch device for use on material handling equipment, including a reed switch and a magnet, wherein the non-contact switch device has on and off positions achieved by the presence or absence of magnetic induction between the magnet and the reed switch. The non-contact switch devices are disclosed in the form of a main power switch, an interlock switch, a limit switch.

9 Claims, 6 Drawing Sheets

NON-CONTACT SWITCH DEVICES FOR USE ON MATERIAL HANDLING EQUIPMENT

TECHNICAL FIELD

The invention relates to non-contact switch devices for use on material handling equipment, such as pallet trucks, pallet stackers and the like, wherein the non-contact switch devices realize switch on and off positions by the presence or absence of magnetic induction between a magnet and a reed switch. Depending on the structure of the non-contact switch device, switch actuation to move from the off to the on position may occur based on the presence or absence of a magnet and/or shielding or non-shielding of a magnet relative to a reed switch.

BACKGROUND

Material handling equipment is widely used in warehouses, stores and other facilities, and electric powered vehicles are continuing to become more popular for at least environmental and noise related advantages over gas powered vehicles. Electric powered vehicles also have advantages over manual powered vehicles relating to at least capacity, operator safety and efficiency. Electrical switches are commonly used on material handling equipment to realize different functions, such as a main key switch device having power on and off positions relating to providing power to the material handling equipment, an interlock switch device having on and off positions relating to being able to drive the material handling equipment, and a limit switch device having on and off positions relating to controlling movement of a load lift portion of material handling equipment.

Traditional contact switches used in material handling equipment generally are of a type of electro-mechanical switch or mechanical micro switch. Such switches provide a particular function by having the operator directly move an electrical contact to touch or engage another electrical contact in a specific position, such as when turning a key in a switch lock cylinder. The switches may require a fairly large volume, and tend to make switch design and layout somewhat difficult. The common switches used also have a relatively short service life because the contacts may be exposed to the atmosphere and their ability to function is subject to wear, corrosion and dirty working conditions. These issues can lead to increased costs due to downtime of the equipment and the need for maintenance or replacement.

SUMMARY

The subject matter of this disclosure provides advantages over the typical electrical switches normally used on prior art electrical material handling equipment, such as pallet trucks, pallet stackers and the like. The non-contact switch devices of the present disclosure include reed switch configurations that include switch elements in the form of a pair of contacts on ferrous metal reeds that are encapsulated within inert gas or a vacuum as they are hermetically sealed in a glass tube or chamber. As such, the reeds and contacts are not subject to the atmosphere, or the heavy wear, corrosion or dirty working conditions of the traditional switches. The sealed structure provides greater safety because they permit use of the non-contact switch devices in a corrosive atmosphere or in the presence of flammable or explosive gas.

The non-contact switch devices also are relatively compact, reliable and provide for easy design and layout, with simple actuation. The switches also can be designed with the reed contacts normally in an open position, so as to close when subjected to a magnetic field, or normally closed, so as to open when subjected to a magnetic field, with the reed contacts returning to their normal position when the magnet is removed or shielded from the reed switch.

This non-contact actuation based on the presence or absence of a magnetic field is in contrast to prior art electric switches used on material handling equipment that have switch contacts that require touching or engagement between contacts that also may be exposed to the atmosphere and suffer due to wear, corrosion and dirty conditions, leading to a short service life.

In a first aspect, the disclosure provides a non-contact switch device for use on material handling equipment, including a reed switch and a magnet, wherein the non-contact switch device has on and off positions achieved by the presence or absence of magnetic induction between the magnet and the reed switch.

It is to be understood that both the foregoing general description and the following detailed description are exemplary and provided for purposes of explanation only, and are not restrictive with respect to the claimed subject matter. Further features and advantages will become more fully apparent in the following description of the example preferred embodiment and from the appended claims.

BRIEF DESCRIPTION OF THE DRAWINGS

In describing the preferred examples, references are made to the accompanying drawing figures wherein like parts have like reference numerals. For ease of viewing and comprehension, the figures show only particular operative components of the electrical systems.

Figure 1A:
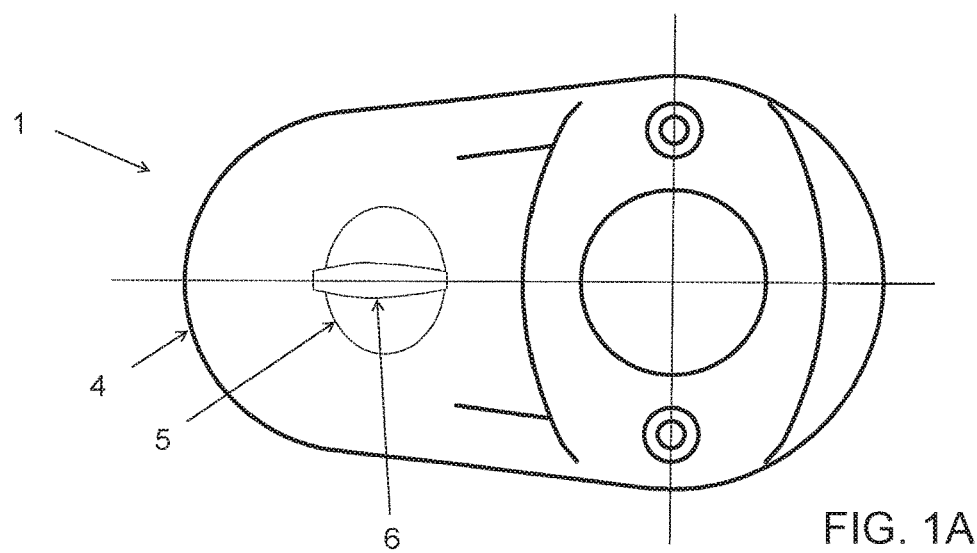
FIG. 1A shows a top view of a non-contact switch device functioning as a main power switch for material handling equipment, with a magnet cap having a magnet and being inserted into a switch socket of a switch body.

It should be understood that the drawings are not necessarily to scale. While some details of the material handling equipment, and other plan and section views of the particular components have been omitted, such details are considered to be within the comprehension of those skilled in the art in light of the present disclosure. It also should be understood that the present disclosure is not limited to the examples illustrated and described.

DETAILED DESCRIPTION OF THE PREFERRED EMBODIMENT

This disclosure provides solutions to the technical problems presented by electrical switches commonly used for various functions when operating material handling equipment, such as are used in pallet trucks, pallet stackers and the like. Examples of non-contact switch devices that realize switch on and off positions by the presence or absence of magnetic induction between a magnet and a reed switch are shown in various forms in FIGS. 1A-5C for use on material handling equipment, such as a pallet truck. The non-contact switch devices are shown for example in the form of a main power switch 1 for a pallet truck in FIGS. 1A-1C, with a schematic view of the reed switch elements of that non-contact switch device in FIGS. 2A-2B, in the form of an interlock switch 20 on a handle of a pallet truck in FIGS. 3 and 3A-3C, with a schematic view of the reed switch elements of that non-contact switch device in FIGS. 4A-4B, and in the form of a limit switch 40 associated with movement of the load lift portion of the pallet truck in FIGS. 5 and 5A-5B, which also is represented by the schematic view of the reed switch elements of that non-contact switch device in FIGS. 4A-4B.

The non-contact switch devices 1, 20 and 40 of the present disclosure are embodied in reed switch configurations that include reed switch elements in the form of a pair of contacts on the ends of reeds that are within a hermetically sealed glass envelope or chamber. At least one of the reeds is constructed using ferromagnetic material, such as a ferrous metal, for example iron, cobalt and nickel, while depending on the design, the other reed may be constructed using non-magnetic material. The reed switch elements may be predisposed to normally be open or spaced apart when not in the presence of a magnet, so as to close or touch together in the presence of a magnet, such as in the non-contact switch device 1 represented in FIGS. 1A-1C and 2A-2B. Alternatively, the reed switch elements may be predisposed to normally be closed or touching together when not in the presence of a magnet, so as to open or move to be spaced apart in the presence of a magnet, such as in the non-contact switch devices 20 and 40 represented in FIGS. 3 and 3A-3C, 4A-4B, 5 and 5A-5C. It will be appreciated that the reed switch may be designed to have one or both reeds move when subjected to a magnetic force.

Figure 1B:
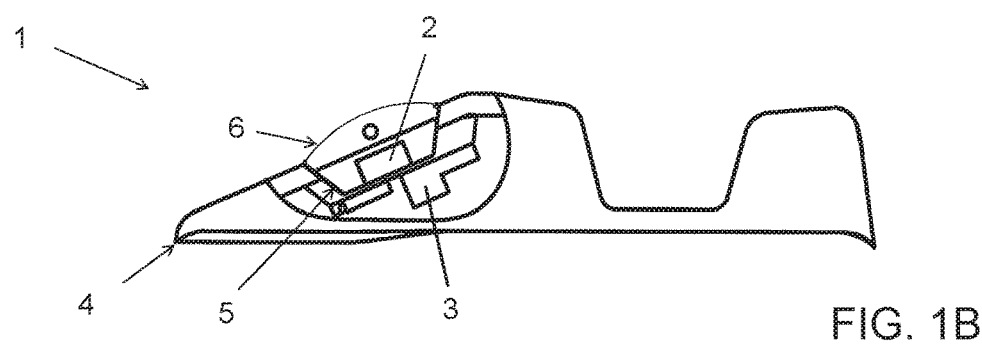
FIG. 1B is a side view of the switch body of FIG. 1A, with a partial cutaway in the area of the inserted magnet cap and the switch socket.
Figure 1C:
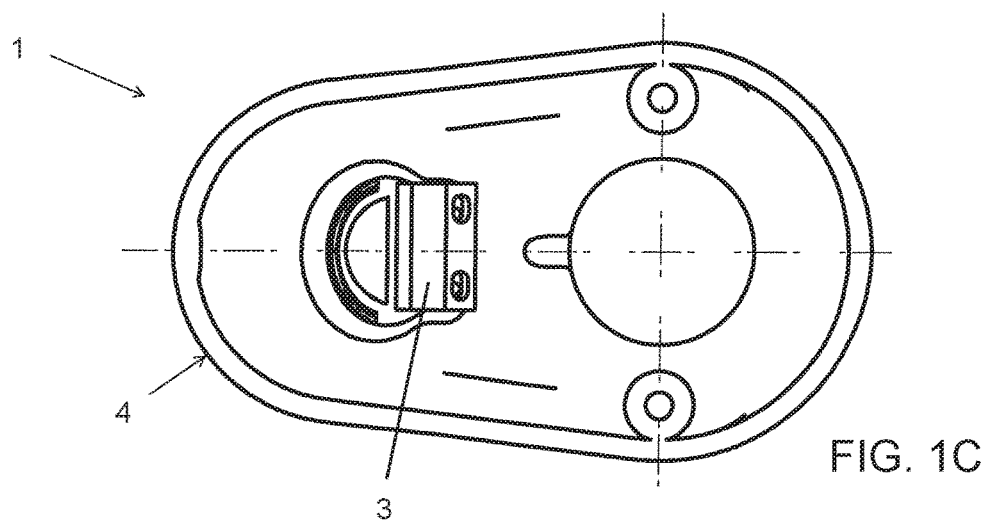
FIG. 1C is a bottom view of the switch body of FIG. 1A, showing components of the switch socket.

As shown in FIGS. 1A-1C, the disclosure provides a first example non-contact switch 1 that is a main power switch, which includes a magnet 2 and a reed switch 3. The reed switch 3 is held within and connected to a switch body 4 that includes a switch socket 5 and may be mounted on a surface of material handling equipment for convenient access by an operator, such as on a top surface of a pallet truck or the like. The magnet 2 may be a permanent magnet and is held or embedded within a magnet cap 6, which simply otherwise may be constructed of plastic and which is removably receivable in the switch socket 5.

Figure 2A:
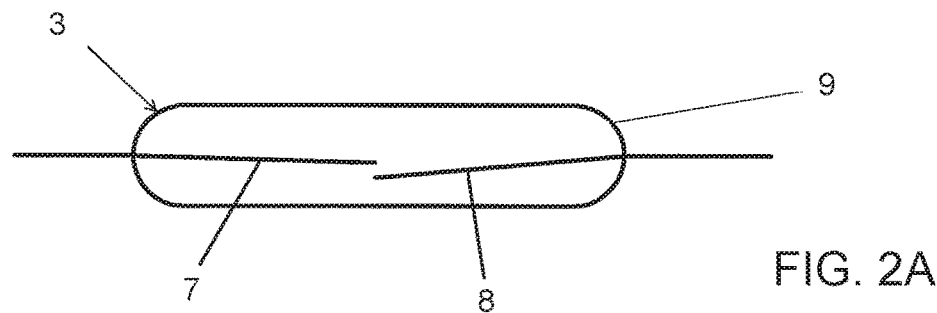
FIG. 2A is a schematic view corresponding to an open position of the non-contact switch device of FIGS. 1A-1C, showing the reed switch elements disengaged, which occurs when the magnet cap is not inserted into the switch socket.
Figure 2B:
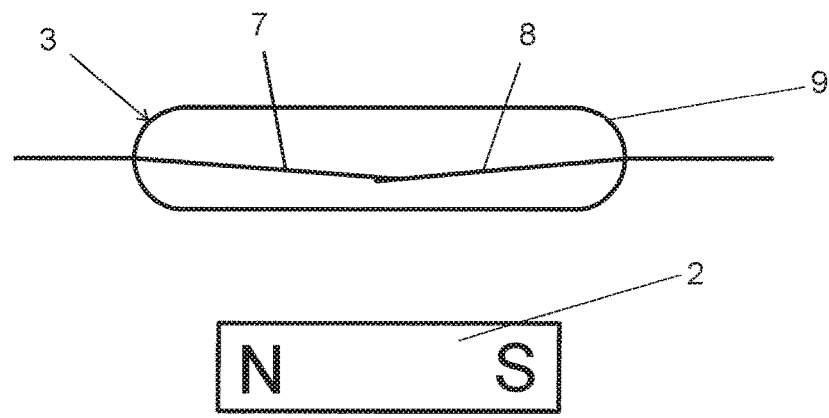
FIG. 2B is a schematic view corresponding to a closed position of the non-contact switch device of FIGS. 1A-1C, showing the reed switch elements engaged, which occurs when the magnet cap is inserted into the switch socket.

As seen in the schematic view in FIGS. 2A and 2B, the reed switch 3 includes reed elements 7 and 8 that are encapsulated within inert gas or a vacuum as they are hermetically sealed in a glass tube or chamber 9. In this example, as seen in FIG. 2A, the non-contact switch device 1 is normally in an open position because the reed elements 7 and 8 are normally in a spaced apart position when not in the presence of the magnet 2. When the magnet cap 6 is placed in the switch socket 5, the magnet 2 is brought into close proximity of the reed switch 3. The magnetic field caused by the presence of the magnet 2 causes the reed element 7 to be attracted to and move toward the magnet 2, which results in the reed element 7 moving into contact with the reed element 8, closing the reed switch 3 and thereby moving the non-contact switch device 1 to an on position.

The non-contact switch device 1 including the magnet 2 and magnetic reed switch 3 preferably provides an easier structure to employ, requires a smaller volume, is actuated at a faster speed, and yields a longer service life than traditional mechanical switches used on material handling equipment. The non-contact switch device 1 also has stronger resistance and is more reliable than electric switches. Its switching reed elements 7 and 8 are sealed in an inert gas or vacuum, and are not in contact with the external environment. This greatly reduces the co-oxidation and carbonization by contacts during the opening and closing process. It also prevents external vapor, dust and other impurities from eroding the contacts.

Thus, a first example non-contact switch device 1 is represented in FIGS. 1A-1C and 2A-2B. The non-contact switch device 1 for use on material handling equipment includes a magnet 2 and a reed switch 3, wherein the non-contact switch device 1 has on and off positions achieved by the presence or absence of magnetic induction between the magnet 2 and the reed switch 3. The non-contact switch device 1 is in the on position when the magnet 2 is placed in close proximity to the reed switch 3, and is in the off position when the magnet 2 is not in close proximity to the reed switch 3.

The example non-contact switch device 1 has the magnet cap 6 that includes the magnet 2 and the switch socket 5 that includes the reed switch 3. When the magnet cap 6 is placed in the switch socket 5, the magnet 2 is in close proximity to the reed switch 3 and the non-contact switch device 1 is in the on position. When the magnet cap 6 is removed from the switch socket 5, the magnet 2 is not in close proximity to the reed switch 3 and the non-contact switch device 1 is in the off position. In light of this disclosure, it will be appreciated that with the non-contact switch device 1 of the first example, the magnet cap 6 and switch socket 5 are part of a main power switch device for material handling equipment, such as a pallet truck, with the main power switch having a power on and off function corresponding to the on and off positions, wherein the magnet cap 6 may simply be removed and placed in a pocket when the equipment is not in use.

As shown in FIGS. 3 and 3A-3C, the disclosure provides a second example non-contact switch 20 wherein a magnet 22 and a reed switch 23 are in a spaced apart position and the non-contact switch device 20 is in the off position when a shielding member 21 is located between the magnet 22 and the reed switch 23, and is in the on position when the shielding member 21 is not located between the magnet 22 and the reed switch 23. The second example non-contact switch device 20 is in the form of an interlock switch. The magnet 22 and reed switch 23 may be connected to the same component, such as a bracket, and are connected to a base portion 24 of a pallet truck P and are spaced apart by a gap 25. The magnet 22 may be a permanent magnet. The shielding member 21 is connected to an operator handle 26 that pivots relative to the base portion 24, and the shielding member 21 may have more than one extensions that act as a shield.

With the second example non-contact switch device 20, the magnet 22 and the reed switch 23 are spaced apart by the gap 25 and the non-contact switch device 20 is in the off position when the shielding member 21 is located between the magnet 22 and the reed switch 23, and is in the on position when the shielding member 21 is not located between the magnet 22 and the reed switch 23.

Figure 4A:
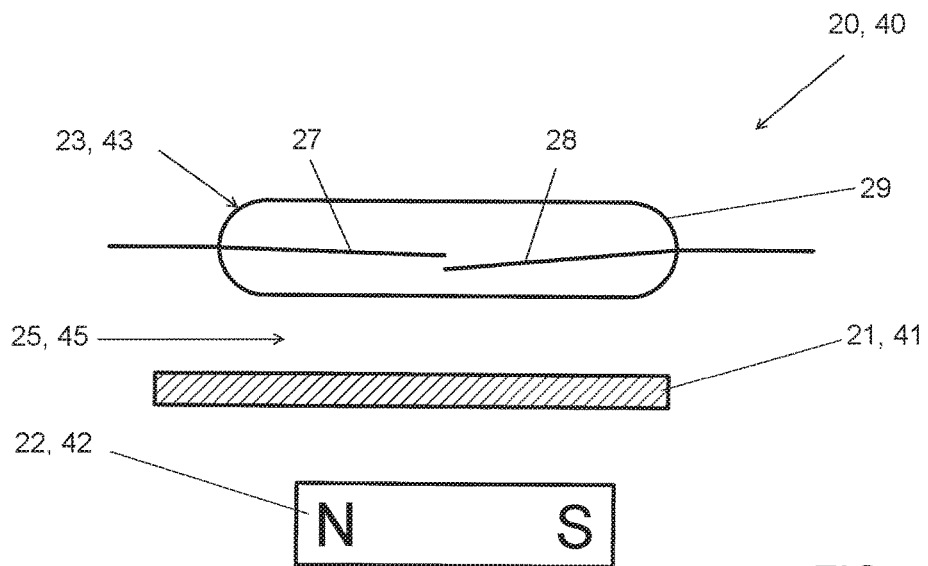
FIG. 4A is a schematic view corresponding to the open position of the non-contact switch device in FIGS. 3A and 3C, showing the reed switch elements disengaged, which occurs when a shielding member is located between the magnet and the reed switch.
Figure 4B:
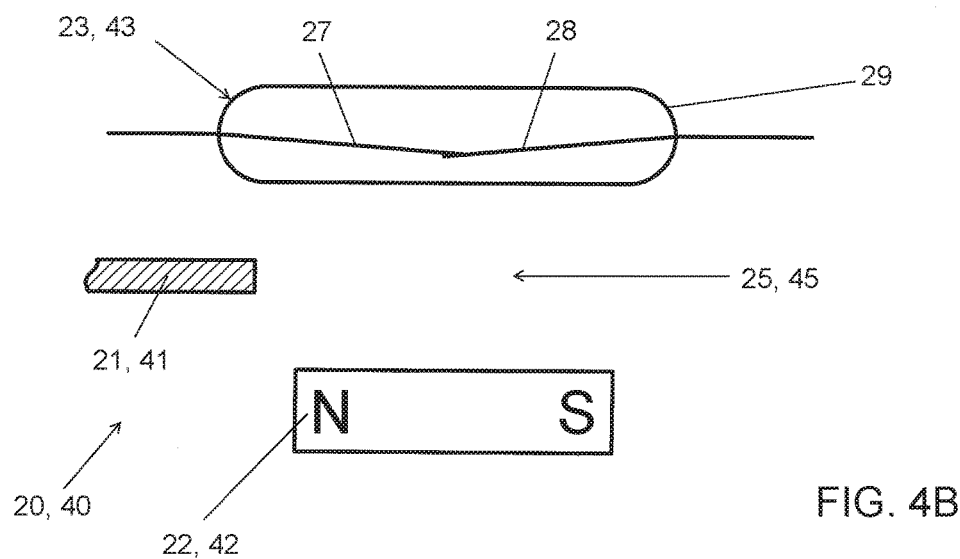
FIG. 4B is a schematic view corresponding to the closed position of the non-contact switch device in FIG. 3B, showing the reed switch elements engaged, which occurs when the shielding member is not located between the magnet and the reed switch.

As seen in the schematic view in FIGS. 4A and 4B, the reed switch 23 includes reed elements 27 and 28 that are encapsulated within inert gas or a vacuum as they are hermetically sealed in a glass tube or chamber 29. In this example, as seen in FIG. 4B, the non-contact switch device 20, which has the magnet 22 and reed switch 23 in fixed positions with the gap 25 therebetween, normally is in a closed position because the magnet 22 attracts the reed element 27 toward and into contact with the reed elements 28. When the shielding element 21 is moved to be located in the gap 25 between the magnet 22 and the reed switch 23, as seen in FIG. 4A, the reed element 27 returns to a pre-deflected position spaced apart from reed element 28, opening the reed switch 23, so as to be moved to the off position.

Figure 3:
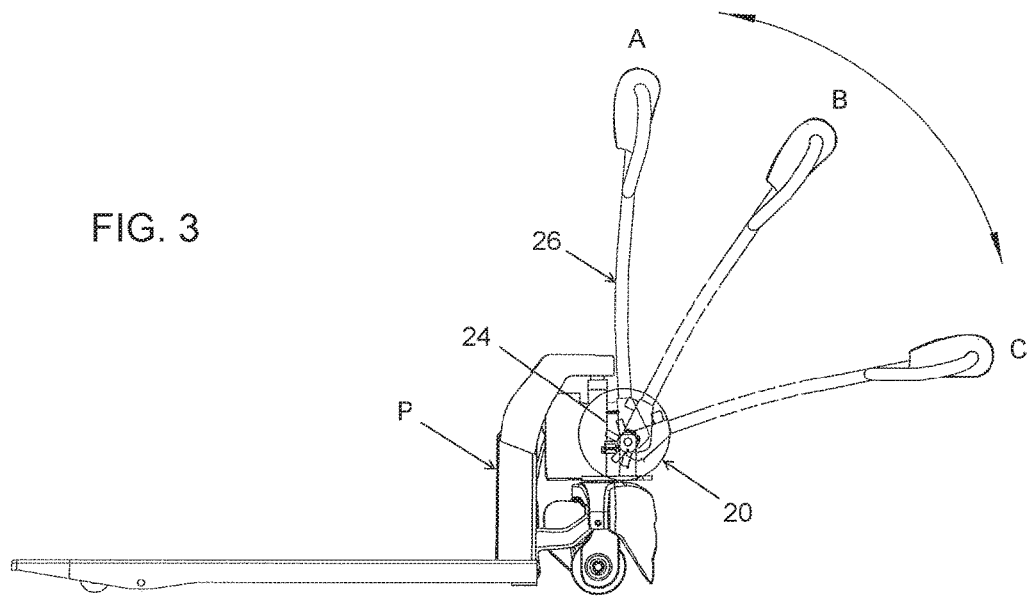
FIG. 3 is a side view of an example pallet truck with the operator handle shown in a generally vertical or fully upright parked position A, an angled operating position B, and a generally horizontal or fully lowered inactive position C, with the non-contact switch device area shown in a circle and the non-contact switch device functioning as an interlock switch.
Figure 3A:
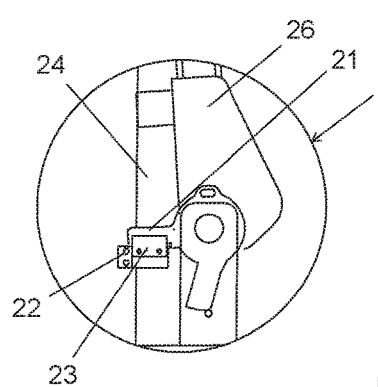
FIG. 3A is a close up view of the non-contact switch device area circled in FIG. 3 when the operator handle is in the generally vertical or fully upright parked position A, with the non-contact switch device in the off position.

While this second example non-contact switch device 20 includes a shielding member 21, it will be appreciated that the non-contact switch device 20 also operates in response to the presence or absence of a magnetic field between the magnet 22 and the reed switch 23. FIG. 3 is a side view of the pallet truck P showing the operator handle 26 in three example positions A, B and C, which provide different operational states of the non-contact switch device 20 in the form of an interlock switch.

The example pallet truck P is shown with the operator handle in a generally vertical parked position A, an angled operating position B, and a generally horizontal inactive position C. A close up view of the non-contact switch device 20 in FIG. 3A corresponds to the generally parked position A of the operator handle 26. With the operator handle 26 essentially fully upright in a parked position, the shielding member 21 is located between the magnet 22 and the reed switch 23, placing the non-contact switch device 20 in an open position, as shown in FIG. 4A. With the reed elements 27 and 28 no longer in contact, the power cannot flow through the reed switch 23 and a controller prevents the pallet truck P from being driven.

Figure 3B:
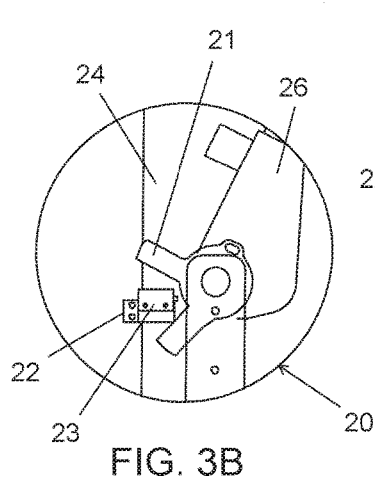
FIG. 3B is a close up view of the non-contact switch device area circled in FIG. 3 when in the operator handle is in the angled operating position B, with the non-contact switch device in the on position.
Figure 3C:
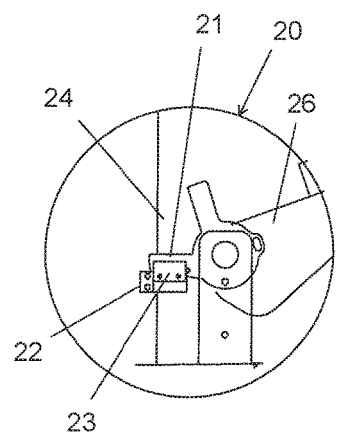
FIG. 3C is a close up view of the non-contact switch device area circled in FIG. 3 when the operator handle is in the generally horizontal or fully lowered inactive position A, with the non-contact switch device in the off position.

When an operator wishes to drive the pallet truck P, the operator may grasp the operator handle 26 and tilt it to an inclined operating position, such as position B. The operating position generally may be at an angular position anywhere between the generally vertical or fully upright position A and the generally horizontal or fully lowered position C. In an operating position B, the shielding member 21 that is connected to the operator handle 26 is moved so as to no longer be located in the gap 25 between the magnet 22 and the reed switch 23, as represented in FIGS. 3B and 4B. This permits the reed switch 23 to close, which corresponds to being in the on position shown in FIG. 4B, wherein power is able to flow through the reed switch 23 and a controller makes the pallet truck P drivable. Thus, the operator is able to utilize the controls on the operator handle 26 to operate and drive the pallet truck P.

If the operator were to inadvertently drop the operator handle 26, it would move to the generally horizontal, fully lowered position C, shown in FIG. 3. This would result in the non-contact switch device 20 being in the position shown in FIG. 3C, wherein another shielding member 21 on the operator handle 26 is moved to be located in the gap 25 between the magnet 22 and the reed switch 23. Thus, as a safety precaution, the non-contact switch device 20 would be opened and moved to the off position, rendering the drive system inactive when the operator handle is moved to a generally horizontal position C.

As shown in FIGS. 5 and 5A-5C, the disclosure provides a third example non-contact switch 40 wherein a magnet 42 and a reed switch 43 are in a spaced apart position and the non-contact switch device 40 is in the off position when a shielding member 41 is located between the magnet 42 and the reed switch 43, and is in the on position when the shielding member 41 is not located between the magnet 42 and the reed switch 43. The third example non-contact switch device 40 is in the form of a limit switch. The magnet 42 and reed switch 43 may be connected to the same component, such as a bracket, and are connected to a load lift portion 44 of a pallet truck P and are spaced apart by a gap 45. The magnet 42 may be a permanent magnet. The shielding member 41 is connected to a rotating link 46 that pivots relative to the load lift portion 44 as the load lift portion 44 is raised or lowered.

With the third example non-contact switch device 40, the magnet 42 and the reed switch 43 are spaced apart by the gap 45 and the non-contact switch device 40 is in the on position when the shielding member 41 is not located between the magnet 42 and the reed switch 43, and is in the off position when the shielding member 41 is located between the magnet 42 and the reed switch 43.

Figure 5:
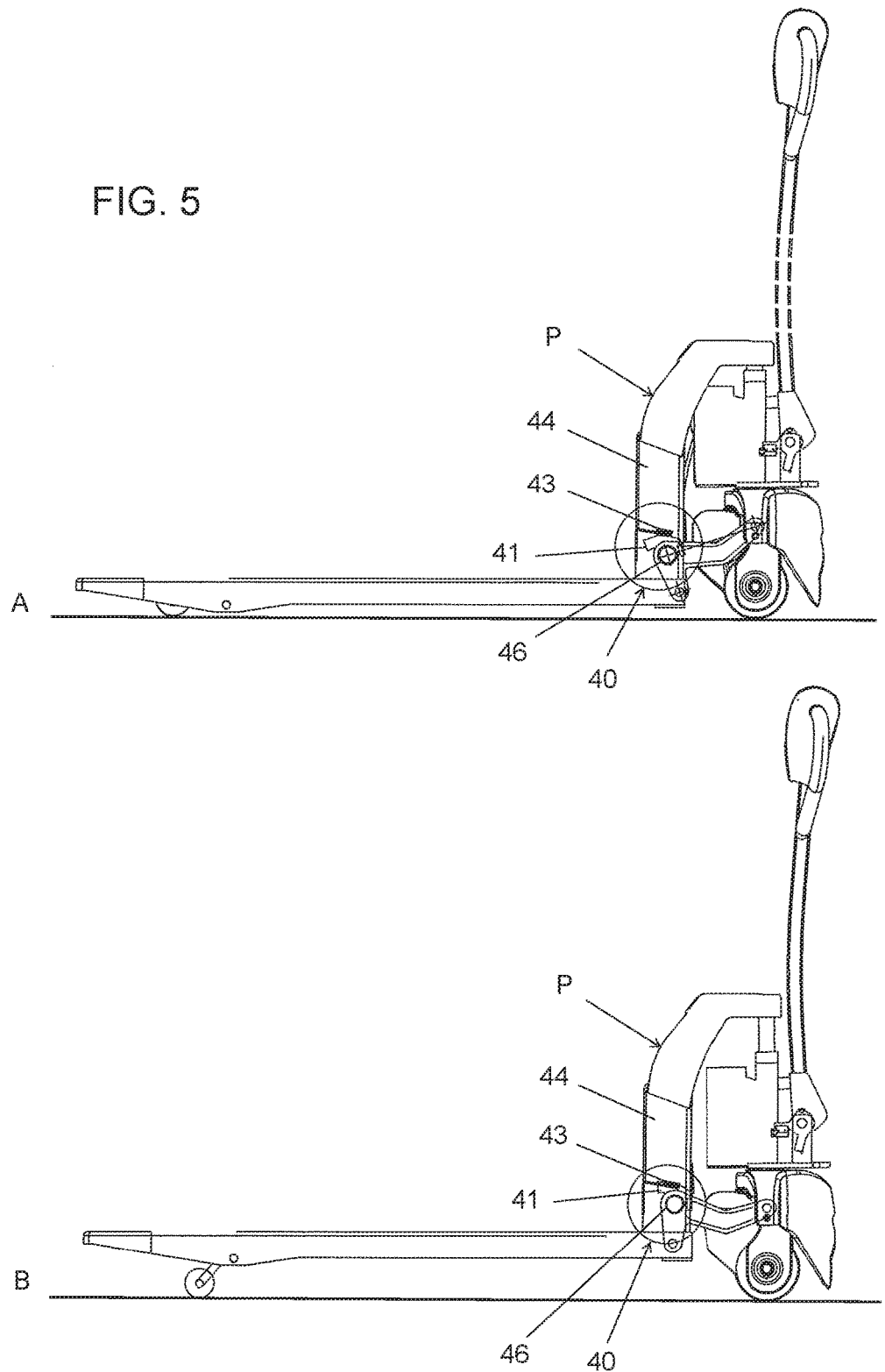
FIG. 5 is a side view of the example pallet truck with the load lift portion in a lowered position A in the upper view, and in a preselected uppermost raised position B in the lower view, with the non-contact switch device area shown in a circle and the non-contact switch device functioning as a limit switch.
Figure 5A:
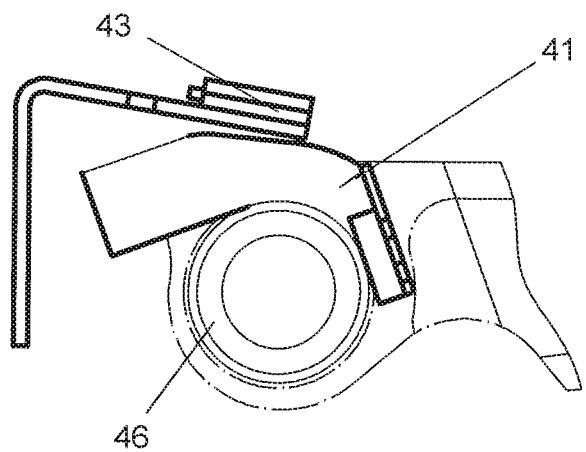
FIG. 5A is a close up side view of the non-contact switch device area circled in FIG. 5 when the load lift portion is in the lowered position A, with the non-contact switch device in the on position as the shielding member is not located between the magnet and the reed switch.
Figure 5B:
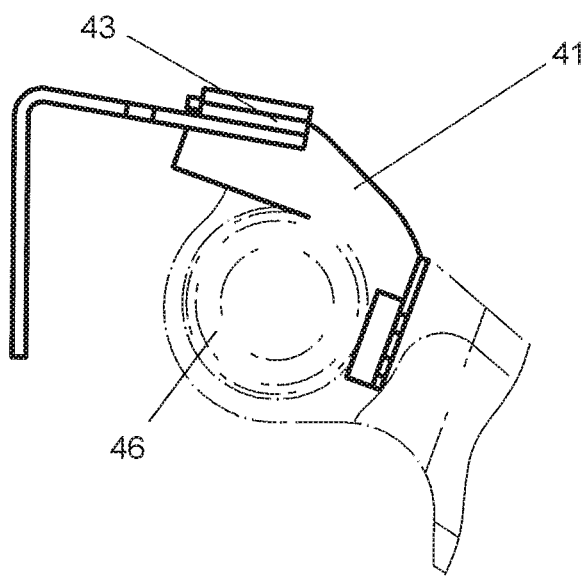
FIG. 5B is a close up side view of the non-contact switch device area circled in FIG. 5 when the load lift portion is in the preselected uppermost raised position B, with the non-contact switch device in the off position as the shielding member is located between the magnet and the reed switch.
Figure 5C:
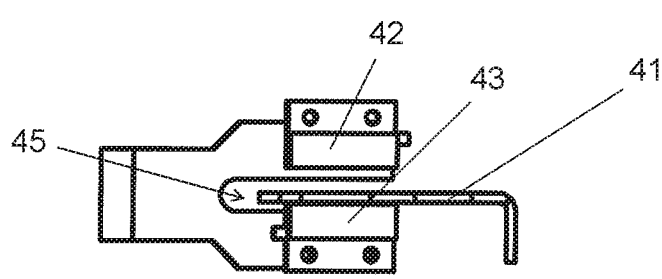
FIG. 5C is a close up top view of the non-contact switch device area circled in FIG. 5 when in the load lift portion is in the preselected uppermost raised position B, with the non-contact switch device in the off position as the shielding member is located between the magnet and the reed switch.

As seen in the schematic view in FIGS. 4A and 4B, and similar to the second example, the reed switch 43 of the third example includes reed elements 27 and 28 that are encapsulated within inert gas or a vacuum as they are hermetically sealed in a glass tube or chamber 29. In this third example, FIG. 5 shows a lowered position A of the load lift portion 44, which corresponds to the position shown in FIG. 5A. This further corresponds to the schematic view seen in FIG. 4B where the non-contact switch device 40 is in the on position, which permits an operator to raise the load lift portion 44. The load lift portion 44 may be raised to a preselected position, such as the position B shown in FIG. 5. The raised position B in FIG. 5 corresponds to the position of the non-contact switch device 40 shown in FIGS. 5B and 5C, where the link 46 has rotated sufficiently to cause the shielding member 41 to move to a location in the gap 45 between the magnet 42 and the reed switch 43. This further corresponds to the schematic view seen in FIG. 4A where the non-contact switch device 40 is in the off position, which stops the rising load lift portion 44 at a preselected uppermost raised position, which represents a limit of travel.

The magnet 42 and reed switch 43 are in fixed positions with the gap 45 therebetween, and when the load lift portion 44 is in the lowered position, the non-contact switch device 40 normally is in a closed position because the magnet 42 attracts the reed element 27 toward and into contact with the reed elements 28, as shown in FIG. 4B. When the link 46 rotates as the load lift portion 44 is raised, the shielding element 41 is moved to be located in the gap 45 between the magnet 42 and the reed switch 43, as seen in FIG. 4A, where the reed element 27 returns to a pre-deflected position spaced apart from reed element 28, opening the reed switch 43, so as to be moved to the off position.

While this third example non-contact switch device 40 includes a shielding member 41, it will be appreciated that the non-contact switch device 40 also operates in response to the presence or absence of a magnetic field between the magnet 42 and the reed switch 43.

The above description is provided with respect to preferred examples of the non-contact switch devices for use on material handling equipment, such as pallet trucks, pallet stackers and the like. It will be appreciated, however, that the invention may be constructed and configured in various ways and is not limited to the specific examples shown and described herein, and its use is not limited to pallet trucks.

Thus, the present disclosure presents alternatives to traditional switches used on prior art material handling equipment. The non-contact switch devices provide advantageous features by permitting more compact, reliable switches that are less susceptible to wear, corrosion and issues that shorten switch service life. This results in lower costs and less downtime for maintenance or switch replacement.

It will be appreciated that the present disclosure shows and demonstrates preferred examples of non-contact switch devices for use on material handling equipment, which is discussed in the context of an example pallet truck, a pallet stacker or other material handling equipment. Indeed, these examples are merely illustrative and are not to be considered limiting. It will be apparent to those of ordinary skill in the art that the devices may be constructed and configured for use in various material handling equipment, without departing from the scope or spirit of the present disclosure. Thus, although examples non-contact switch devices have been described herein for use in a pallet truck, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A non-contact switch device for use on material handling equipment, comprising:
    a magnet and a reed switch;
    wherein the non-contact switch device has on and off positions achieved by the presence or absence of magnetic induction between the magnet and the reed switch;
    wherein the non-contact switch device includes at least two shielding members that are spaced apart and connected to a pivotal portion of the material handling equipment;
    wherein the reed switch and magnet of the non-contact switch device are in a spaced apart position and the non-contact switch device is in the off position when the pivotal portion of the material handling equipment is in a first pivotal position wherein a first one of the shielding members is located between the magnet and the reed switch, is in the off position when the pivotal portion of the material handling equipment is in a second pivotal position wherein a second one of the shielding members is located between the magnet and the reed switch, and is in the on position when the pivotal portion of the material handling equipment is in a pivotal position located between the first and second pivotal positions and no shielding member is located between the magnet and the reed switch; and
    wherein the magnet and reed switch are connected to a base portion and the at least two shielding members are connected to the pivotal portion of the material handling equipment which pivots relative to the base portion.

2. The non-contact switch device of claim 1, wherein the non-contact switch device is part of an interlock switch.

3. The non-contact switch device of claim 1, wherein the pivotal portion of the material handling equipment is an operator handle of a pallet truck and the non-contact switch device is in the off position with the first shielding member located between the magnet and the reed switch when the operator handle is in a generally vertical position.

4. The non-contact switch device of claim 3, wherein the pallet truck is in a parked position when the operator handle is in the generally vertical position.

5. The non-contact switch device of claim 1, wherein the pivotal portion of the material handling equipment is an operator handle of a pallet truck and the non-contact switch device is in the on position with no shielding member located between the magnet and the reed switch when the operator handle is in a generally inclined operating position.

6. The non-contact switch device of claim 5, wherein when the operator handle is in the generally inclined operating position, the pallet truck is drivable.

7. The non-contact switch device of claim 1, wherein the pivotal portion of the material handling equipment is an operator handle of a pallet truck and the non-contact switch device is in the off position with the second shielding member located between the magnet and the reed switch when the operator handle is in a generally horizontal position.

8. The non-contact switch device of claim 7, wherein the operator handle is in an inactive position when the operator handle has been moved to the generally horizontal position.

9. A non-contact switch device for use on material handling equipment, comprising:
   a magnet and a reed switch;
   wherein the non-contact switch device has on and off positions achieved by the presence or absence of magnetic induction between the magnet and the reed switch;
   wherein the material handling equipment includes a load lift portion and a pivotal portion that pivots relative to the load lift portion as the load lift portion is raised or lowered;
   wherein the pivotal portion is a pivotal link and the non-contact switch device includes at least one shielding member that is connected to the pivotal link; and
   wherein the reed switch and magnet of the non-contact switch device are in a spaced apart position and are connected to the load lift portion and are raised and lowered with the load lift portion; wherein the non-contact switch device is part of a limit switch; the non-contact switch device is in the on position with no shielding member located between the magnet and the reed switch when the load lift portion is in a lowered position and is ready to be raised; and the non-contact switch device is in the off position with the shielding member located between the magnet and the reed switch when the load lift portion is in a preselected uppermost raised position.

* * * * *